Figure 6:
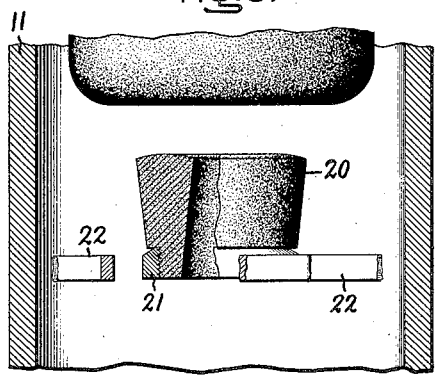

Sept. 29, 1936.  G. W. BRUCKER  2,056,034
ANODE BAFFLE FOR MERCURY ARC RECTIFIERS
Filed Oct. 22, 1930  2 Sheets-Sheet 1
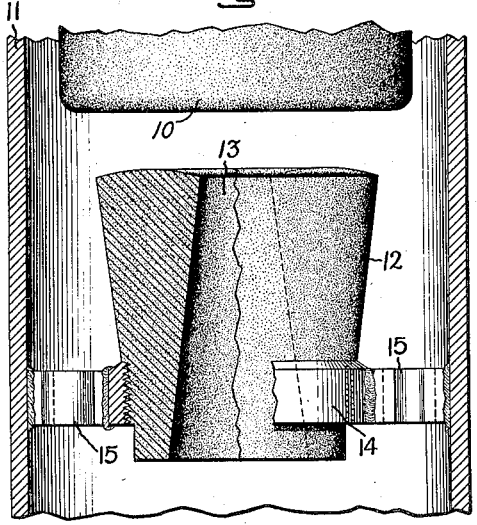
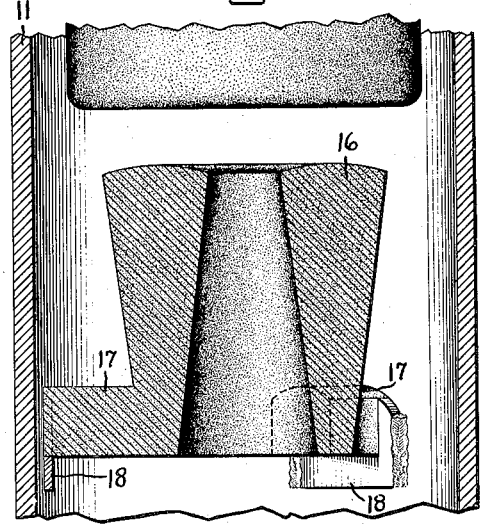
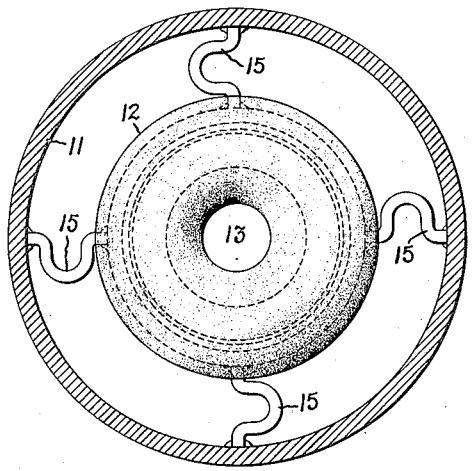
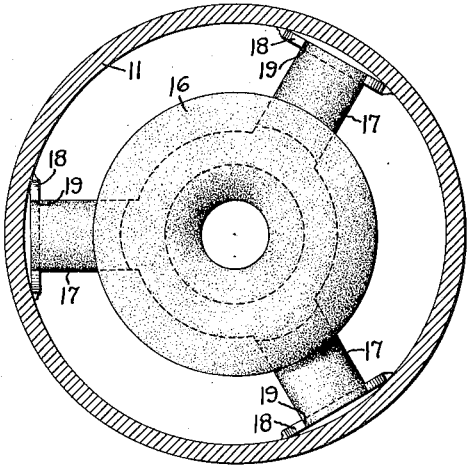
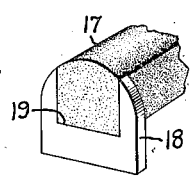
Inventor:
George W. Brucker,
by Charles E. Mullen
His Attorney.

Sept. 29, 1936.　　　G. W. BRUCKER　　　2,056,034
ANODE BAFFLE FOR MERCURY ARC RECTIFIERS
Filed Oct. 22, 1930　　　2 Sheets-Sheet 2

Inventor:
George W. Brucker,
by Charles E. Mullan
His Attorney

Patented Sept. 29, 1936

2,056,034

UNITED STATES PATENT OFFICE 2,056,034

ANODE BAFFLE FOR MERCURY ARC RECTIFIERS

George W. Brucker, Schenectady, N. Y., assignor to General Electric Company, a corporation of New York Application October 22, 1930, Serial No. 490,484

3 Claims. (Cl. 250—27.5)

My invention relates to vapor electric devices such as mercury arc rectifiers, particularly to anode baffle or de-ionizing grid members for such devices, and has for its principal object the provision of an improved anode baffle or grid member which is not subject to damage by heat due to the occurrence of arc back.

Various baffle or grid structures have been proposed in the past for the anodes of vapor electric devices such as the mercury arc rectifier to reduce ionization in the neighborhood of the anodes, and thereby to permit the use of high vapor pressures in the rectifier and the carrying of higher overloads. Such anode baffles or de-ionizing members have been composed heretofore of metal.

In one form previously suggested the baffle is a tubular metallic member shaped as a frustum of a cone, and having hollow walls through which cooling water is circulated. It has been found that this latter type of baffle, having water-cooled walls, is subject to the disadvantage that, upon occurrence of arc back in the rectifier, a cathode spot may form on a wall of the baffle and melt it through, thereby breaking the vacuum and permitting water to enter the evacuated chamber of the rectifier. It appears that the cooling of this metal baffle by water is not always sufficient to absorb the heat generated from a cathode spot concentrating upon a limited area of the metal wall.

In accordance with my invention this difficulty is avoided by the provision of a de-ionizing element or baffle having the same shape and proportions as the above-described water-cooled baffle, but the walls of which in contact with the mercury vapor are composed of a carbon material, preferably graphite, and which, therefore, is not affected by the formation of cathode spots thereon during abnormal arc-back conditions, while offering all the de-ionizing advantage of the metallic water-cooled type of anode baffle.

My invention will be better understood from the following description when considered in connection with the accompanying drawings and its scope will be pointed out in the appended claims.

Referring to the drawings, Figs. 1 and 2 are respectively a side elevation and a plan view of one embodiment of my invention; Figs. 3 and 4 are respectively a side elevation and a plan view of a modification of the invention illustrated in Figs. 1 and 2; Fig. 5 is a fragmentary view of mounting means for the de-ionizing member shown in Figs. 3 and 4; Figs 6 and 7 and Figs. 8 and 9 illustrate in side elevations and plan views two further modifications of my invention.

In the embodiment of my invention shown in Figs. 1 and 2 an anode 10 of a mercury arc device such as a rectifier is provided with the usual hollow shield 11 extending downwardly a suitable distance and having its lower end open to permit movement of the arc therethrough. In order to cut down ionization in the vicinity of the anode 10 to the desired degree, a baffle element 10 or de-ionizing member 12 is provided which is arranged adjacent the lower end of the anode and at a distance therefrom of the order of one to one and one-half inches for an anode having a diameter of the order of four to six inches.

In accordance with my invention member 12 is so constructed that its surfaces in contact with the mercury vapor are of carbon material such as graphite, the member being constituted preferably by a single continuous body of this material.

As shown in Figs. 1 and 2 the body of graphite constituting the de-ionizing member 12 has the form of a frustum of a cone, the diameter of the larger base thereof being substantially as great as the height of the frustum. This larger base is adjacent the anode and a passage 13 is formed extending through the member, the walls of this passage forming the frustum of a cone having its smaller diameter at the upper end of the member and adjacent the anode. To mount the de-ionizing member 12 in the shield 11, the lower end of this member is threaded into an annular member or ring 14 of suitable mercury resistant metal and this ring is connected to the wall of the shield 11 by supporting members 15 of similar metal which are bent to provide resiliency and to permit slight movement of the ring and de-ionizing member assembly with relation to the shield, due to expansion and contraction under varying heat conditions.

In the operation of the mercury arc rectifier comprising the de-ionizing member or baffle 12, upon occurrence of arc-back the melting through of metal baffle walls and consequent leakage of cooling water into the rectifier does not occur, since the hollow, water-cooled metal baffle is replaced by a solid member of carbon material. Further the surfaces of this member are not fused or melted or otherwise damaged by the arc-back since these surfaces are composed of a carbon material such as graphite. This material requires such a high temperature to disintegrate it that damage of any kind to the member 12 due to heat from a cathode spot forming thereon is minimized or entirely obviated.

In the form of my invention shown in Figs. 3 to 5 the de-ionizing member comprises a tubular member 16 similar to the member 12 shown in Figs. 1 and 2 but further comprises lateral extensions or lugs 17, of cross-section as shown in Fig. 5, which are formed integral with the tubular member 16 and which function not only as part of the de-ionizing surface but also as part of the means for mounting the de-ionizing member. To mount the integral body of graphite constituted by the tubular member 16 and the lugs or arms 17 within the shield 11, supporting members 18 shown more clearly in Fig. 5, having recesses 19 formed therein are connected to the wall of the shield as shown in Fig. 4 and the outer ends of arms 17 rest relatively loosely in these recesses, this construction, therefore, also providing for relative movement of the graphite de-ionizing member and the shield due to varying heat conditions, but in a different manner from that of the structure described in connection with Figs. 1 and 2.

Figure 7:
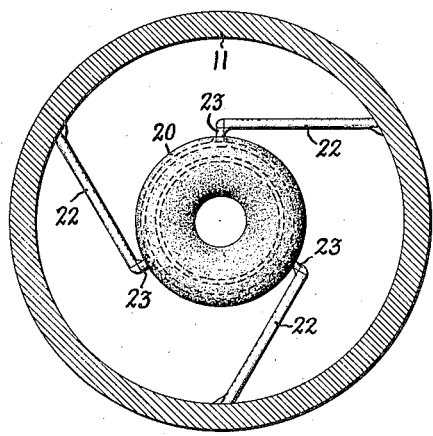

In the form of the invention shown in Figs. 6 and 7, the construction is in general similar to that shown in Figs. 1 and 2, a tubular graphite member 20 being threaded into a metallic collar or ring member 21, but the ring member in the form shown in Figs. 6 and 7 is connected to the shield 11 by supporting members 22 which are substantially tangent to the periphery of the ring member and which may be provided with a short extension 23 at a right angle to the main portion thereof. This mounting provides a resilient mounting for the de-ionizing member within the shield and permits relative movement of these members due to varying heat conditions.

Figure 8:
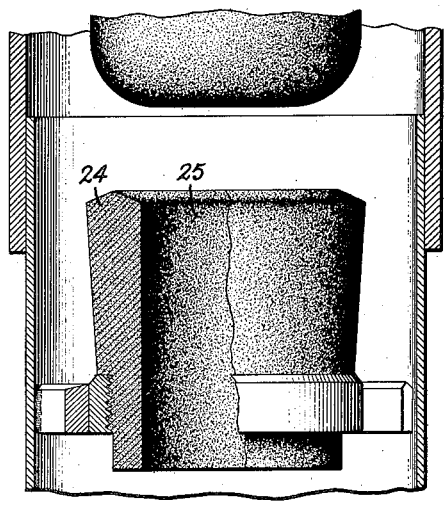
Figure 9:
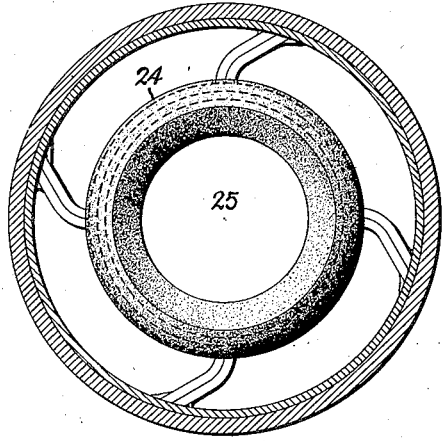

In the form of the invention shown in Figs. 8 and 9, the construction is in general similar to that shown in Figs. 1 and 2 and in Figs. 6 and 7. In Figs. 8 and 9, however, the de-ionizing member is constituted by a tubular body of graphite 24 having a passage 25 therethrough which is substantially cylindrical and which is of relatively large diameter compared to the average outside diameter of the de-ionizing member, this member, therefore, providing a relatively larger passage for the arc and having relatively thinner walls than the corresponding de-ionizing members in the forms of the invention shown in Figs. 1 to 4.

What I claim as new and desire to secure by Letters Patent of the United States, is:—

1. In a mercury arc device comprising an anode, a cathode, and a hollow shield surrounding said anode, a tubular member composed of graphite to de-ionize the vapor from said cathode in the vicinity of said anode, and means to mount said member in said shield, one end of said graphite member being adjacent said anode, said means comprising an annular member in contact with the other end of said graphite member and a plurality of supporting members extending from said annular member to the wall of said shield.

2. In a mercury arc device comprising an anode, a cathode, and a hollow shield surrounding the anode, a member composed of carbon material to deionize the vapor from the cathode in the vicinity of the anode, and means to mount said member on the shield, said means comprising a plurality of supporting arms composed of carbon material extending laterally of said member and means providing a relatively loose connection of the ends of said arms to the wall of the shield, whereby said member is movable relative to the shield under varying temperature conditions.

3. In a mercury arc device comprising an anode, a cathode, and a hollow shield surrounding the anode, a member composed of carbon material to deionize the vapor from the cathode in the vicinity of the anode, said member comprising a central portion and a plurality of supporting arms formed of carbon material integrally with said central portion of said member, and means providing a relatively loose connection of the outer ends of said arms to the wall of the shield, whereby said member is movable relatively to the shield under varying heat conditions.

GEORGE W. BRUCKER.